United States Patent [19]

Ahrens et al.

[11] Patent Number: 4,691,159

[45] Date of Patent: Sep. 1, 1987

[54] PARTIAL SHUNT SWITCHING LIMITER FOR A SPACECRAFT SOLAR-PANEL OR LIKE POWER-SOURCE ARRAY

[75] Inventors: Allan F. Ahrens, Acton; Robert M. Martinelli, Torrance, both of Calif.

[73] Assignee: Hughes Aircraft Company, Los Angeles, Calif.

[21] Appl. No.: 771,396

[22] Filed: Aug. 30, 1985

[51] Int. Cl.[4] .............................................. G05F 5/00
[52] U.S. Cl. ................................... 323/222; 323/906; 363/21; 363/26; 307/72
[58] Field of Search .............................. 323/222, 906; 363/19–21, 24–26; 307/48–50, 72, 77

[56] References Cited

U.S. PATENT DOCUMENTS 4,375,662  3/1983  Baker ............................... 323/906 X Primary Examiner—Peter S. Wong
Attorney, Agent, or Firm—Joseph A. Sawyer, Jr.; Mark J. Meltzer; A. W. Karambelas

[57] ABSTRACT

This regulating system for an array of solar panels or the like consists of a tap connection into the array, and a boost switching regulator connected to the tapped array. The tap connection divides the array into first and second portions, and the switching regulator is connected so that its power-input terminals are across only one of the two portions of the array. The power-output terminals of the switching regulator are connected across the load (i.e., across the entire array), and the sensing or feedback terminals of the regulator receive a signal which acts as a measure of voltage or current at the load.

Boost regulators do not dump overvoltage into a dissipative load; hence the invention prevents local heat generation and resulting spacecraft heat-balance problems of conventional dissipative regulators. Furthermore, in the circuit of the present invention, negligible power flows through the regulator at the end of the solar-panel useful life; hence efficiency losses in the boost regulator itself are avoided when power is at its greatest premium.

12 Claims, 10 Drawing Figures

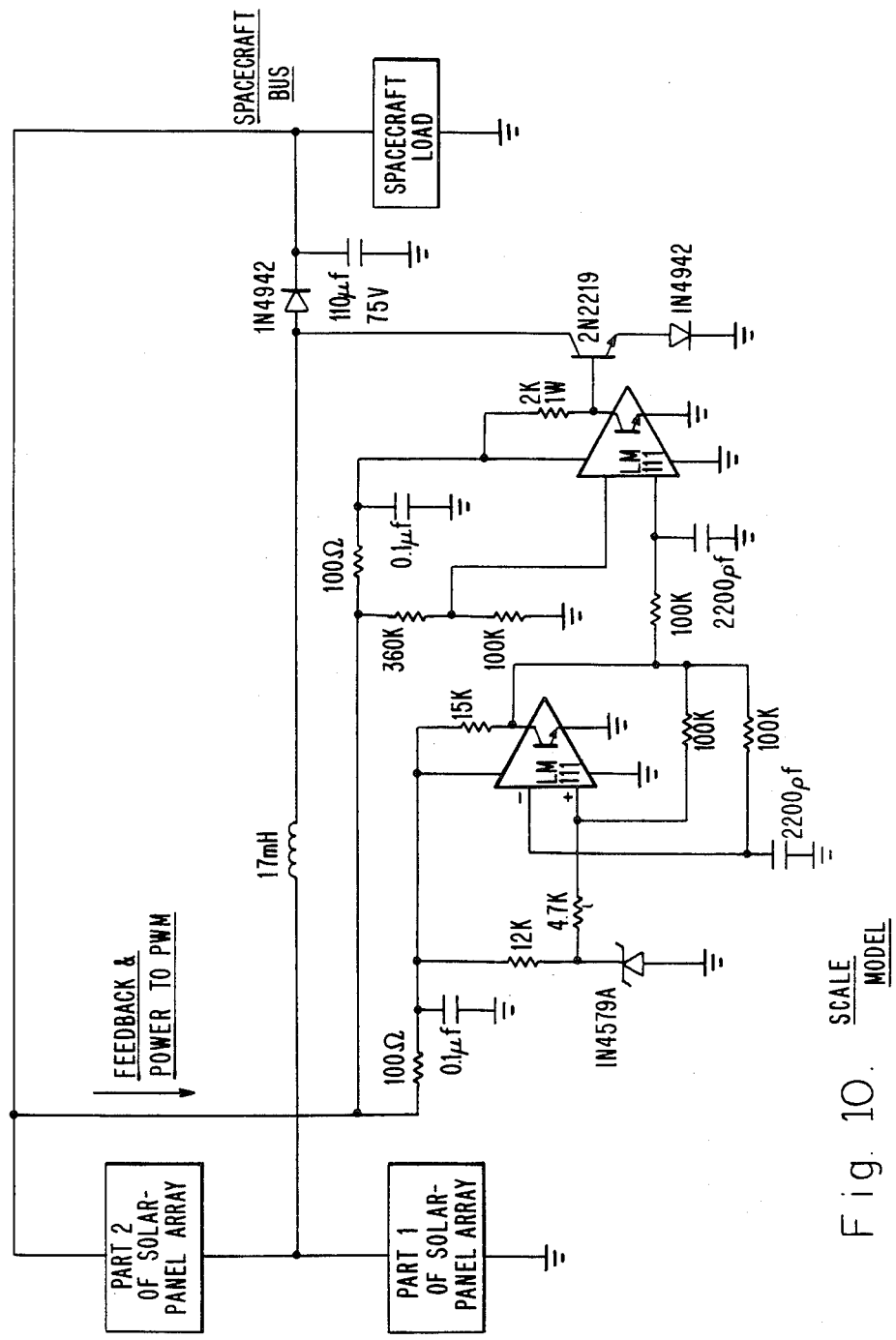
Fig. 10. SCALE MODEL

PARTIAL SHUNT SWITCHING LIMITER FOR A SPACECRAFT SOLAR-PANEL OR LIKE POWER-SOURCE ARRAY

BACKGROUND OF THE INVENTION

1. Field of the Invention

This invention relates generally to voltage-or current-regulating systems, and more particularly to regulating systems for spacecraft solar panels or like power sources in a series array.

2. Description of the Related Art (a) Dissipative Shunt Limiters—Conventional regulating systems for spacecraft solar panels use full-shunt or tap-shunt dissipative voltage limiters as illustrated in FIGS. 4 and 5 respectively.

In these sytems an "error amplifier" compares a calibrated fraction of the output voltage to a reference voltage, and if the output voltage is excessive opens a shunt path that draws current from the solar-panel array (FIG. 4) or from part of it (FIG. 5). As progressively higher current is drawn from the shunted solar panels, the inherent current-voltage characteristic of those panels forces their output voltage downward. If the overvoltage is high enough, the voltage on some of the shunted panels collapses entirely.

In spacecraft these systems are disadvantageous because the shunt current heats the shunt-path transistor switch, and any other elements in the shunt path. This localized heating in turn produces a thermal-balance problem whose magnitude is highly variable with the condition of the solar panels, the operating mode of the load, the sunlight available for collection by the solar panels, and the temperature of the spacecraft—historically as well as instantaneously. In spacecraft that are subject to attitude variations, this parameter too affects the magnitude of the thermal-balance problem. All of these parameters typically vary greatly during and over the life of the craft, making a simple compensating system very difficult to design for all conditions.

The amount of power dissipated or "dumped" in the shunt path typically may be as high as seventy watts in a three-hundred-watt supply system, or roughly twenty-three percent. This is a rather large fraction of the overall dissipation in a spacecraft to be dissipated in a highly localized fashion.

The power dissipation in the full-shunt configuration (FIG. 4) is even larger. Unfortunately, however, when used in the tap-shunt configuration (FIG. 5) dissipative shunt limiters have yet another disadvantage: the selection of the tap-point position along the series array is a very "fussy" design decision. The tap-point location is a critical parameter because the precise amount of the dissipation depends upon that location.

Nevertheless dissipative tap shunt limiters have been considered the best compromise because at least they do not interfere with power transfer from the source to the load when the solar panels are at the end of their useful life. At that time the limiters in effect remove themselves from the circuit, allowing the from the failing panels. load to wring every last small amount of remaining power (b) Boost Switching Regulators—Boost switching regulators of several types are common in many basic power-handling situations. As in the dissipative shunt limiters discussed above, a boost regulator uses an "error amplifier" to compare some calibrated fraction of the output voltage to a reference voltage; the error amplifier adjusts the output voltage to a generally constant value. Unlike the dissipative limiters, however, a boost regulator does not dump overvoltage through a dissipative auxiliary shunt path.

Rather, a boost regulator operates by continuously controlling the voltage boost ratio through a switched-inductor circuit. The voltage boost ratio of such a circuit is produced inductively as follows.

In the well-known regulator shown in FIG. 6, the transistor switch Q1 cycles on and off. During a first part of the cycle it is turned on, drawing current through the inductor L1 and establishing a magnetic field in the inductor. During a second part of the cycle the switch Q1 is turned off, effectively placing the inductor in series with the power source. The collapse of the magnetic field within the inductor produces a voltage across the inductor, and the resulting current in the inductor flows through the diode D1 into the load.

During this second part of the cycle the voltage applied to the load is equal to the sum of the supply voltage and the inductor voltage. Hence, the circuit can produce a substantial voltage boost ratio. An output capacitor C1 stores the higher voltage, and the diode D1 prevents reverse current from the capacitor back into the inductor or the switch during the first part of each subsequent cycle (when the input end of the diode is essentially grounded). The capacitor also acts as a filter to reduce ripple voltage at the load resulting from the cycling of the switch Q1 and the inductor L1.

The voltage boost ratio of this circuit is controlled continuously by variation of the waveform supplied to the transistor switch Q1. The control signal applied to the base of the switch is a rectangular pulse of variable frequency or duty cycle, or both.

In one common type of system the frequency is fixed while the duty cycle varies; in other words, the range of possible output signals from the error amplifier is converted to a corresponding range of pulse widths in the "pulse-width modulator" block PWM. For example, the modulator PWM can be arranged to lengthen the duration of output-current pulses from the inductor L1 to the load when the load voltage is inadequate, and conversely. In this way the load voltage is servocontrolled to the standard desired value.

Another way of controlling the pulse-width fraction (or duty cycle) is to let the error signal directly control the cycling of the switch Q1 on and off, rather than only controlling the pulse width at a fixed frequency. In some systems of this second type the result is to maintain the absolute pulse width relatively constant while allowing the overall period to vary. In other systems of this same general type, both the pulse width and period vary. In designing either of these subtypes care is required because the system is subject to frequency changes.

Ripple filtering requirements at the regulator output can be substantially reduced by using a two-phase regulator such as illustrated in FIG. 7. This circuit is essentially two of the basic boost-regulator circuits of FIG. 6 placed in parallel and operated in opposed phase. In principle the capacitor C2 in this circuit need handle only half the ripple current.

In both boost-regulator circuits discussed so far, it is possible to conceptualize the function of each inductor as alternating between performing the functions of a transformer primary and a transformer secondary: first the inductor receives a "chopped" voltage or a. c.

square wave from the source, then its position in the circuit is in effect switched to deliver a corresponding square wave to the load. These two functions are in effect separated in another boost-regulator variant, the "flyback regulator," appearing in FIG. 8.

Here, as before, an inductor L2 receives the chopped input by operation of the cycling of a transistor switch Q2, but the inductor L2 is coupled to another inductor L3. Loosely speaking, the inductor L2 functions more nearly as the primary of an actual transformer—whose secondary is the other, coupled inductor L3. The latter delivers an output rectangular wave to the load and to the storage and ripple-filtering capactior C3, through a diode D2 which operates as a half-wave rectifier. In this circuit the output voltage from the output inductor L3 is not added to the voltage from the supply; rather the output current from the output inductor L3 is forced into the load in parallel with the current from the supply.

Yet another boost-regulator variant, the "current-fed inverter," appears in FIG. 9. This circuit is in effect a transformer-coupled version of the boost regulator of FIG. 6: it provides separate primary windings L4$a$ and L4$b$—which are energized in opposed phase—and corresponding separate secondary windings L5$a$ and L5$b$ whose rectified outputs are connected in parallel to provide a two-phase or full-wave output. (Here the interconnected inductors L4$a$, L4$b$, coupled to the interconnected inductors L5$a$ and L5$b$, form a transformer literally.) The primary L4$a$, L4$b$ is fed through a series inductor L6 which functions generally in the same fashion as the inductor L1 of FIG. 6.

To some people skilled in the art of power electronics, a flyback regulator or a current-fed inverter may not be a species of boost switching regulator. For definiteness of this document we therefore define the phrase "boost switching regulator" to include flyback regulators, current-fed inverters, and in fact any device than can function as a feedbackcontrolled "dc transformer." A feedback-controlled dc transformer is a circuit that (1) accepts dc input power and produces dc output power, and (2) has a variable ratio of output voltage to input voltage, and (3) has a ratio of output current to input current that varies approximately in inverse proportion to the voltage ratio, neglecting internal losses, and (4) servocontrols either of those ratios to hold a parameter of the output power constant.

In all of the boost-regulator circuits illustrated in FIGS. 6 through 9, the power-input terminals are connected across substantially the entire power supply. The power-output terminals are connected across the load, and the voltage-sensing terminals receive a voltage which is a measure (typically a calibrated fraction) of the voltage across the load.

As conventionally used these boost-regulator circuits all share a common disadvantage, namely that all of the power supplied from the power source to the load flows through the boost-regulator components: the inductor or inductors, transistor switch or switches, diode or diodes, and (particularly in the half-wave variants) the capacitor. Since none of these components are ideal, they all have some resistive character and consequently dissipate some energy in the performance of their functions.

Consequently, each boost-regulator circuit has some overall inefficiency, generally between five and ten percent, in its power-handling behavior. In other words, typically five to ten percent of the power flowing from the source to the load is lost in the regulator.

Unfortunately, this dissipation continues unabated during the entire life of the craft. Boost switching regulators as conventionally used therefore waste a very significant fraction of the power from the solar panels of a spacecraft at the end of the spacecraft life, the very time when power waste cannot be tolerated. In effect, boost regulators as so used shorten the overall life of the entire craft—by some fraction related in a complex way to the inefficiency factor of five to ten percent.

(c) Efficiency Comparisons—During tne early part of the useful life of a solar panel, such losses from a boost switching regulator are generally acceptable. The localized heating produced is only about twenty to forty-five percent of the earlier-mentioned power fraction (i.e., twenty-three percent of the overall system power) typically dissipated by dissipative shunt limiters.

However, there is a countervailing consideration. The dissipation in a boost switching regulator arises as a fraction of the total power to the load and therefore continues during the entire life of the craft, whereas the dissipation by dissipative shunt limiters arises as a higly variable fraction of the excess power from the source and therefore vanishes at the end of the life of the spacecraft.

In the absence of the present invention, troublesome thermal-control considerations consequently must be traded off on an all-or-nothing basis against crucial power-availability considerations, in the design of systems for spacecraft power regulation. Heretofore it has been considered necessary to operate spacecraft under either (1) the thermal-control handicaps associated with dissipative shunt limiters or (2) the life-shortening handicaps associated with boost regulators.

SUMMARY OF THE DISCLOSURE

Our invention resolves these competing constraints by making it possible to use a boost switching regulator for spacecraft solar-panel regulation without running any power through the regulator at the end of the life of the solar panels.

Consequently, the invention makes it possible to avoid both the high localized heating associated with dissipative shunt limiters and the end-of-life power wastage conventionally associated with boost-regulator circuits.

This invention is a voltage- or current-regulating system for solar panels or the like in a series array, whose output is applied to a load. Although certain other types of power source may be used with our invention, for simplicity of discussion in most of this document we will refer to solar panels. The system includes a tap connection to the array, dividing the array into first and second portions in series. The system also includes a boost switching regulator that has power-input, power-output, and voltage- or current-sensing terminals.

The regulator is connected so that the power-input terminals are across only one portion of the array, not the entire power supply as in prior-art boost-regulator applications.

For definiteness the portion of the array to which the power-input terminals are connected will be called the "first" portion, and the remaining part of the array will be called the "second" portion.

The regulator power-output terminals are connected across the load, and the entire solar-panel array is also connected across the load. Typically, in fact, the entire array of panels may be connected directly across the load. In other words, the overall solar-panel array and the power-output terminals of the regulator are both connected in parallel across the load.

The sensing terminals of the regulator receive a signal which is a measure of the voltage being delivered across the load, or in some embodiments of our invention a measure of the current being delivered into the load. In other words the sensing terminals receive a voltage-or current-monitoring signal, so that the regulator monitors the condition of the load.

Thus (1) only a fraction of the entire array, rather than the entire power source as conventionally, is connected to the power-input terminals of the regulator, and (2) the entire array is connected directly to the load, rather than to the power-input terminals of the regulator as conventionally.

Another way of expressing the difference between the invention and boost-regulator circuits is that the invention removes a series fraction (the "second" part) of the power source from the input of the regulator and connects that fraction of the source instead between the noncommon input and output terminals of the regulator.

In preferred embodiments the boost switching regulator also has a reference source, for comparison with the voltage- or current-monitoring signal mentioned above.

As is well-known, solar panels typically have two distinct operating regions: one region in which they operate generally as constant-current, variable-voltage devices, and another region in which they operate generally as constant-voltage, variable-current devices. Preferred embodiments of the present invention force the first part of the solar-panel array (the part that is connected across the power-input terminals of the regulator) to operate in the constant-current region, and the second part of the array to operate in the constant-voltage region.

The second part of the array in effect is operated as a voltage source, supplying a roughly fixed voltage fraction of the voltage that must be delivered to the load. The current flowing into the load from this source joins the current flowing into the load from the regulator. The amount of current proceeding to the load from the second part of the array varies, depending on the voltage-current characteristics and conditions of both the load and the solar panels, and on the amount of current forced into the load by the regulator.

Although the first part of the array operates at constant current, part of this current flows into the regulator and part flows into the second part of the array. The first part of the array operates at variable voltage, making up the difference between the overall load voltage required and the constant voltage from the second part of the array.

The boost-regulator circuit effects the necessary tradeoffs between current variation in the second part of the array and voltage variation in the first part of the array, to moderate the two operating modes of the two parts of the array to each other.

Turning from the external to the internal operation of the boost-regulator circuit, that operation is essentially as described above. Because of the way the regulator circuit is connected to the source and load, however, the regulator does not handle all the power flowing from source to load. The regulator handles only the power derived from part of the array (the first part), and consequently the fraction of full system power that is subject to the internal inefficiency of the regulator is smaller.

Such dissipative heating as does occur is distributed in the solar panels themselves, where it is more diffusely allocated and therefore more readily accommodated by the thermal-balance processes of the craft.

Furthermore, the regulator "cuts out" when there is no overvoltage—e.g., at the end of the useful life of the solar panels. At the time, essentially none of the load power flows through the regulator, and therefore there is no significant power waste at the end of the useful life of the spacecraft.

All of the foregoing operational principles and advantages of the present invention will be more fully appreciated upon consideration of the following detailed description, with reference to the appended drawings, of which:

BRIEF DESCRIPTION OF THE DRAWINGS

FIGS. 4 and 5 are electrical schematic diagrams of full- and tap-shunt dissipative limiters respectively.

FIG. 6 is an electrical schematic diagram of a simple form of boost switching regulator which can be used as the regulator block of the FIG. 1 embodiment.

Similarly FIG. 7 is a schematic of a "two-phase boost regulator" that can be used as one block of the FIG. 1 embodiment, in place of the FIG. 6 regulator.

Likewise FIG. 8 is a schematic of a "flyback regulator" that can be used as one block of the FIG. 1 embodiment, in place of the FIGS. 6 or 7 regulator.

Likewise FIG. 9 is a schematic of a "current-fed inverter" that can be used as one block of the FIG. 1 embodiment, in place of the FIGS. 6, 7 or 8 regulator.

FIG. 10 is an electrical schematic diagram showing details of a circuit that is an electrical scale model of a circuit that can be used to implement the FIG. 1 embodiment.

DETAILED DESCRIPTION OF PREFERRED EMBODIMENTS

Figure 1:
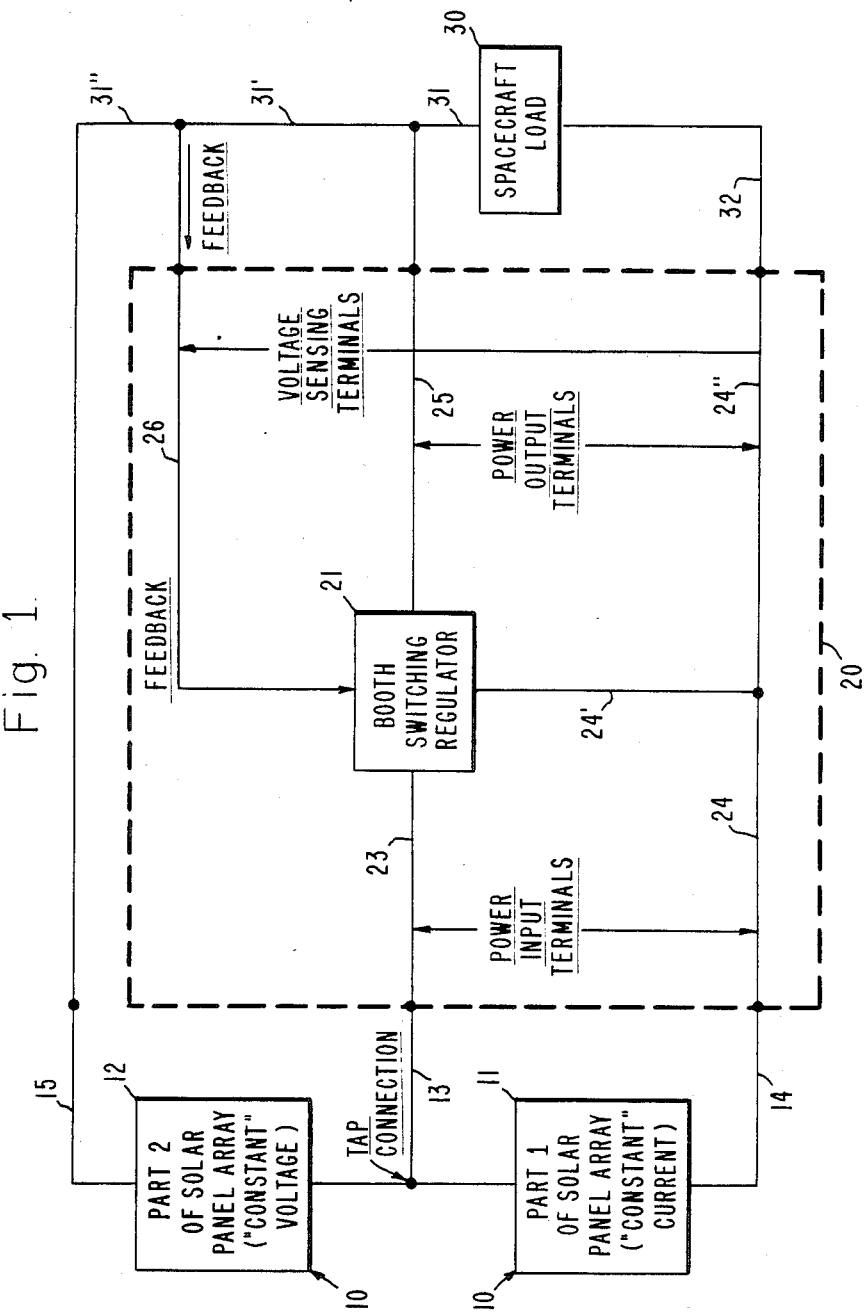
FIG. 1 is an electronic block diagram showing the preferred embodiment of my invention.

FIG. 1 illustrates a genralized form of the preferred embodiment of our invention. The purpose of the invention is to regulate application of power from a solar-panel array 10 or the like to a load circuit 30—particularly, but not necessarily, all or some of the various circuits typically found in a satellite or other spacecraft.

For definiteness of this discussion we will describe a voltage-regulating system that has voltagesensing terminals, although as previously mentioned the system may be configured to regulate current instead (for voltages above the voltage of the "second part" of the array), by monitoring current into the load.

Part of the invention is a tap connection 13 to the solar-panel array 10, dividing the array into two parts.

For definiteness the two parts of the array will be called respectively the "first part" 11 (or "part 1") and the "second part" 12 (or 37 part 2").

Enclosed within the dashed block 20 is a boost switching regulator 21 which has four terminals: a power-input terminal 23, a power-output terminal 25, a voltage-sensing feedback terminal 26, and a common terminal 24'. The common terminal 24' is also illustrated as extended to form a separate power-input terminal 24, for connection to the solar-panel array 10 as at 14; and a separate power-output terminal 24", for connection to the spacecraft load 30 as at 32.

The main difference between the dashed external block 20 and the solid internal block 21 in FIG. 1 is that the internal commonality of the input and output terminals 24, 24" is shown explicitly in the border between the two blocks. Also shown explicitly is the definition of the "power-input terminals" as the noncommon power-input terminal 23 and the common power-input terminal 24; and similarly for the "power-output terminals" and the "voltage-sensing terminals." The drawing has been prepared in this way to clarify and provide a basis for some of the language in the appended claims. However, as will be clear to those skilled in the art of electronic circuitry, many possible configurations within the scope of our claims do not make use of common terminals for all three functions.

The generalized boost switching regulator 21 within the dashed block 20 of FIG. 1 may take any of the forms within the dashed blocks 120, 220, 320 and 420 of FIGS. 6 through 9, or other forms not illustrated.

Upon comparison of FIG. 1 with any of FIGS. 6 through 9 the departure of the invention from the prior art of boost switching regulators may be conceptualized thus: the entire power source is not connected between the power-input terminals 23 and 24 as in the prior art, but rather a portion ("part 2") of the power source has been moved and connected between the noncommon power-input terminal 23 and the noncommon load terminal 31, 31". In fact, this second part 12 of the power source that does not feed the regulator is the larger of the two parts, in terms of both voltage and power. Only enough of the power source is retained as the first part 11 to provide a regulatable supply-voltage fraction that is sufficient to lower the supply voltage to tolerable levels at the beginning of the life of the spacecraft.

As will be seen, however, this is a somewhat simplified explanation, since the operation of the overall system is quite different from that of the prior art.

Now solely for purposes of conveying an understanding of the operation of our invention, we will first discuss a hypothetical operating condition, one which would not normally occur in actual use of the apparatus but which may be more easily understood at the outset of our explanation.

In particular we will assume operation near the beginning of the spacecraft's life, starting with no load (i.e., with infinite load resistance) and no conduction into the regulator 21. This fictitious condition corresponds roughly to all of the spacecraft load circuits such as transceivers and measuring instruments being "off" or quiescent, and the input terminals to the transistor switch or switches Q1, Q1/Q1', Q2, or Q3/Q4 of FIGS. 6 through 9 being disconnected. Under these circumstances open-circuit voltage would appear across both parts 11 and 12 of the solar-panel array. The resulting open-circuit sum voltage from the overall array 10 would considerably exceed the desired control voltage.

Figure 2:
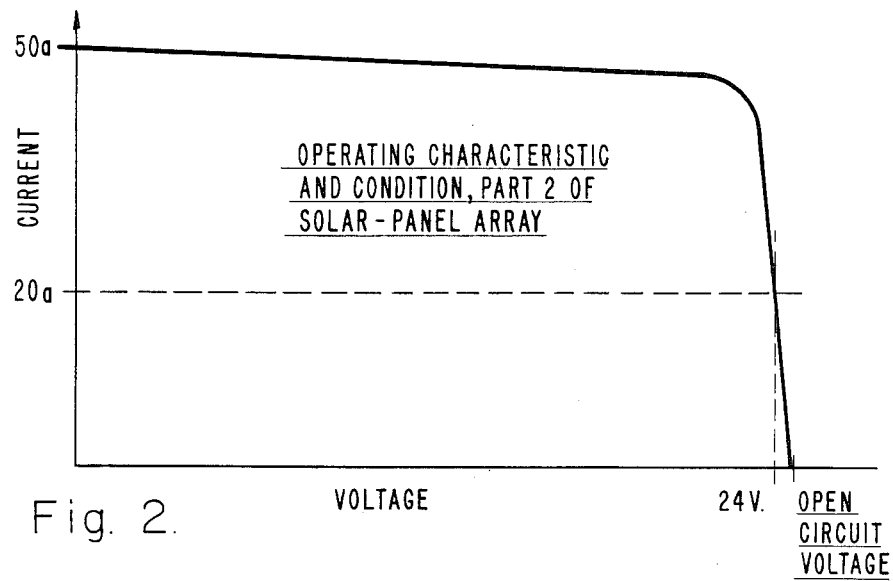
FIG. 2 is a diagram representing the current-voltage chararteristic of a solar panel, and particularly the relatively high-voltage portion of a solar-panel array appearing block of the FIG. 1 embodiment.
Figure 3:
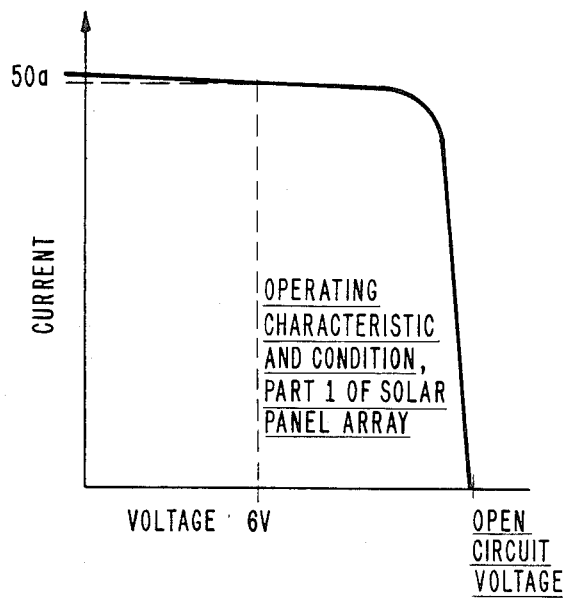
FIG. 3 is a similar current-voltage characteristic diagram, representing particularly the relatively low-voltage portion of a solar-panel array appearing as another block of the FIG. 1 embodiment.

Open-circuit voltage corresponds to the lower right-hand corner of the current-voltage characteristic, as indicated in both FIGS. 2 and 3. In these drawings the slopes of the "constant"-current segments of the curves, relative to the horizontal, have been exaggerated for clarity of function. The angles of the "constant"-voltage segments of the curves, relative to the vertical, are similarly exaggerated. As suggested by the voltage values marked along the abscissae in FIGS. 2 and 3, for solar panels at normal operating temperature the sum of the two open-circuit voltages is typically in the general range of thirty-eight to forty volts, and we assume for the sake of discussion that we are working with a spacecraft whose desired operating voltage is approximately thirty volts.

As some load is applied (i.e., as load resistance is lowered somewhat from infinity), but still assuming no conduction into the regulator, current rises. Assuming that the load resistance is not small enough to draw the saturated "constant" current of some fifty amperes, both panels will continue to operate in their "constant"-voltge regions. This condition is suggested by the dashed lines in FIG. 2 only. By virtue of the exaggerated angle of the so-called "constant"-voltage part of the curve relative to the vertical, it may be seen that the voltage sags only in rough proportion to the fraction of saturation current that is drawn by the load. Voltage thus falls slightly—perhaps one to two volts for twenty amperes into the load, but still remains too high relative to the desired control voltage of roughly thirty volts. (This is a value which in fact is characteristic of each of two power buses in a relatively small satellite). If we continue to assume normal operating temperature of the solar panels, the overvoltage at this point might be, as an example, six to eight volts.

Next in this hypothetical development we can introduce the operation of the regulator into the picture, starting with the feedback voltage-sensing function but still keeping the regulator power-input terminals disconnected. In view of the overvoltage sensed through the voltage-sensing feedback terminals, the regulator will be attempting to modulate the width of power-output pulses from the regulator to essentially zero, and correspondingly the regulator will be attempting to modulate the width of the power-input pulses into the regulator to essentially the full duty cycle. Since we are still assuming that there is no power-input connection, however, no power is flowing in either the input or output of the regulator.

Now we will assume that conduction is permitted into the power-input terminals of the regulator, by connection of the power-input terminals to allow current to flow through the inductor or inductors L1, L1/L1', L2, L6, etc., to the switch or switches Q1, Q1/Q1', Q2, or Q3/Q4 of FIGS. 6 through 9. When this connection is made and the switches first close, the first part 11 of the solar-panel array will initially "see" virtually a dead short or zero resistance load. The resulting instantaneous current from the first part 11 of the array into the regulator will be very high—high enough, in fact, to carry the operation of part 1 of the array well into the so-called "constant"-current region to some point such as represented very generally by the dashed lines in FIG. 3. As is clear from the drawing, following the slight slope of the current-voltage characteristic of part 1 of the array, in the "constant"-current region, the voltage across part 1 accordingly drops very substantially, by more than the six- or eight-volt overvoltage that obtained before the regulator action began.

Now stepping back from the internal operation of the circuits that have been described, it may be helpful to conceptualize any one of the regulators of FIGS. 6 through 9 as a feedback-controlled "dc transformer." As previously mentioned, this is a device with variable voltage boost ratio (output voltage over input voltage), which regulates its own boost ratio to control voltage or current at its output. As in an ac transformer, voltage and current can be traded off against each other as desired while maintaining equal power flow in the primary and secondary—excepting losses due to inefficiency within the transformer. In fact a capacitor is sometimes placed across the input of a boost switching regulator so that the power source "sees" nearly a dc load; and as already noted ripple filtering is provided at the output.

As in an ac transformer, the equality of input and output power implies that the voltage boost ratio is inversely related to the current throughput ratio (output current over input current), neglecting efficiency losses and coupling losses. Consequently, when the voltage boost ratio is raised the current throughput ratio falls in approximate proportion. With this perspective the comments in the second preceding paragraph regarding instantaneous current and voltage can be repeated in reference to average or dc values: the dc current from the first part 11 of the array into the regulator will be high enough to force that first part of the array into the "constant"-dc-current region, as suggested by the dashed lines in FIG. 3. The dc voltage across that first part 11 accordingly drops by more than the six- or eight-volt overvoltage that was present initially.

Since the dc voltage seen by the load is the sum of the voltages from parts 1 and 2 of the array, and since part 2 continues to operate generally as a voltage source per FIG. 2, the dc load voltage likewise drops by more than the overvoltage—say, for example, to two or three volts under the nominal or desired control voltage. Now the regulator receives an undervoltage, through its feedback voltage-sensing terminals 26, 24", and responds by increasing the output power (viewed internally, it accomplishes this by broadening the width of output power pulses to the load), to some nonzero value. The regulator thus pumps into the load some of the power received at the power-input terminals 23, 24, causing the average voltage at the load to rise.

The action of the regulator over the course of several cycles of operation of the pulse modulator tends toward a balance point at which (1) the average current entering the regulator is always high enough to carry part 1 of the array into its saturation region, (2) consistently drawing down the voltage on part 1 of the array by more than the amount required to eliminate the solar-panel overvoltage, but (3) the average current forced into the load by the regulator supplies just added load voltage to correct the undervoltage produced by the voltage drawdown at part 1.

Unlike the operating conditions discussed up to this point, the last-described operating condition is not a hypothetical one, but corresponds to the actual operation of our invention when the solar panels are producing more power than required by the spacecraft load circuits.

Once the system equilibrates in this way, the regulator constrains part 1 of the array to operate as a current source continuously (considered on a time-average basis over the regulator cycle), while part 2 operates as a voltage source continuously. Part 1 is thus amenable, so to speak, to operation at whatever voltage is needed to make up the difference between the nominal load voltage and the constant voltage from part 2. Part 2, on the other hand, is analogously amenable to supplying whatever current is needed to make up the difference between that drawn by the load and that supplied by the regulator.

The current drawn into the regulator from part 1 of the array is not dissipated as in known dissipative shunt limiters, but rather is partly passed forward through the regulator to the load and partly returned in subsequent cycles to part 2 of the array—with the exception of inefficiencies due to nonideal behavior of the inductor or inductors L1, L1/L1', L2/L3, L4/L5, L6 (FIGS. 6 through 9), to voltage drops across the corresponding transistor switch or switches, and so forth.

As the solar panels age over the life of the spacecraft, the current-voltage characteristic curves change—generally shrinking toward the origin in both directions, but with the greater movement occurring at the top part of each curve. That is to say, the maximum current decays: the nearly horizontal portion of each curve migrates downward as the panels age. The current source offered by part 1 of the array thus becomes a source of progressively lower current. This progressively lower current passing into the load tends to develop progressively lower voltage across the load and therefore tends to apply a progressively lower voltage to the regulator feedback voltage-sensing terminals 26, 24".

Offsetting this tendency, the regulator responds to sustain the load voltage by forcing part 2 of the array to supply the progressive current deficit. The way in which the regulator effects this shift in operating equilibrium may be understood in two ways: first in terms of the externally viewed operation of the regulator, considering its lumped operation as a "dc transformer," and second in terms of its internally viewed operation, considering the operation of the pulse-width modulator. As will be seen, part 2 of the array makes up the progressive current deficit from its surplus-current region (FIG. 2) between the horizontal dashed line and the top of the curve.

When the regulator reacts to sustain the monitored load voltage, it can only do so by increasing the voltage boost ratio. As will be recalled, the voltage boost ratio of a "dc transformer" is inversely related to its current throughput ratio. Increasing the boost ratio therefore requires a roughly proportional decrease in the current throughput ratio. Initially, however, assuming that the regulator is able to hold the load voltage constant, the current drawn from the regulator output does not decrease. Therefore, the necessary progressive shift in current throughput ratio initially must be made up entirely at the regulator input: the input current decreases. An equilibration ensues, in which the regulator input current tends toward some value lower than that which flowed before the latest decay in current capability of the solar panels.

Since part 1 of the solar-panel array, however, is still operating in a constant-current mode, albeit at a lower constant current, decrementing the current drawn from part 1 of the array into the regulator makes the decrement in current available to enter part 2 of the array. This increased current into part 2 of course passes through part 2 and into the load, so that part 2 of the array continues to function at constant voltage but at higher current. Another way of describing this is to say that the horizontal dashed line in FIG. 2 rises toward the approximately horizontal solid line.

There is thus a progressive shift in the tradeoffs between parts 1 and 2 of the solar-panel array as the panels age. At the same time progressively less power is handled through the regulator.

Now considering the same progressive compensation process in terms of the internal operation of the regulator, the regulator effectuates these shifts by broadening the relative width of power pulses to the load 30 through its power-output terminals 25, 24". This relative broadening is at the expense of power pulses from part 1 of the array through the power-input terminals 23, 24—that is to say, the input pulses to the regulator are left with a smaller fraction of the total duty cycle of the modulator, and therefore necessarily become relatively narrower.

The results are to decrease the average current from part 1 of the array into the regulator, and thereby to decrease the voltage drawdown of part 1 of the array, and finally to decrease the amount of current pumped by the regulator into the load to compensate for the drawdown excess. In short, progressively less power is handled through the regulator as the panels age.

As the operating point (the horizontal dashed line in FIG. 2) of part 2 of the array rises toward higher currents, the constant-current line (the near-horizontal upper part of the curve in FIG. 2) is also falling to meet it—i.e., moving toward lower currents. At the end of the useful life of the solar panels, the horizontal dashed line in FIG. 2 has moved upward and the nearly horizontal solid top part of the curve in FIG. 2 has moved downward until they have met.

An analogous but somewhat less pronounced progressive decay of the voltage profiles of the two curves (FIGS. 2 and 3) occurs simultaneously, and the vertical dashed line in FIG. 3 accordingly moves rightward toward the leftward-migrating right end of the part-1 constant-voltage line.

The regulator circuit of our invention, however, readily accommodates the extreme or endpoint conditions and all of the intermediate conditions, continuing to force part 1 of the array to operate as a current source and part 2 as a voltage source—until the current through parts 1 and 2 in simple series is no longer sufficient to develop the desired nominal voltage across the load. Otherwise viewed, the system continues to regulate until the sume of the voltages from part 1 and part 2 is less than the nominal, desired supply voltage to the load.

At that point, there is an undervoltage and the regulator can only respond by adjusting its voltage boost ratio to infinity, corresponding to a current throughput ratio of zero. Since the regulator output current cannot be infinite, the current ratio of zero means that, at this stage, the regulator input current must fall to zero. Now in the absence of current drain into the regulator input terminals, there is of course no power handled through the regulator. Further, there is no voltage drawdown in part 1 of the array. Full available voltage and current from the solar panels is therefore applied directly to the load.

Turning to the internal-operation analysis, in attempting to sustain load voltage, the regulator adjusts the width of its ouput power pulses to the maximum available value—namely, the entire cycle of the pulse modulator. This adjustment leaves no part of the pulse-modulator cycle for input power pulses; hence, there is no significant current into the regulator power-input terminals, no voltage drawdown of part 1 of the array, no drawdown excess to be compensated by power into the load through the regulator power-output terminals and, in short, no power at all handled through the regulator.

Consequently, at the end of the spacecraft life, the power-handling inefficiency percentage of the regulator is applied to a zero power flow, yielding a product of zero power wasted in regulator inefficiency. The only power consumed by the regulator is the negligible quantity required to maintain the operation of the error amplifier and pulse modulator, and to hold the transistor switch or switches off.

Figure 4:
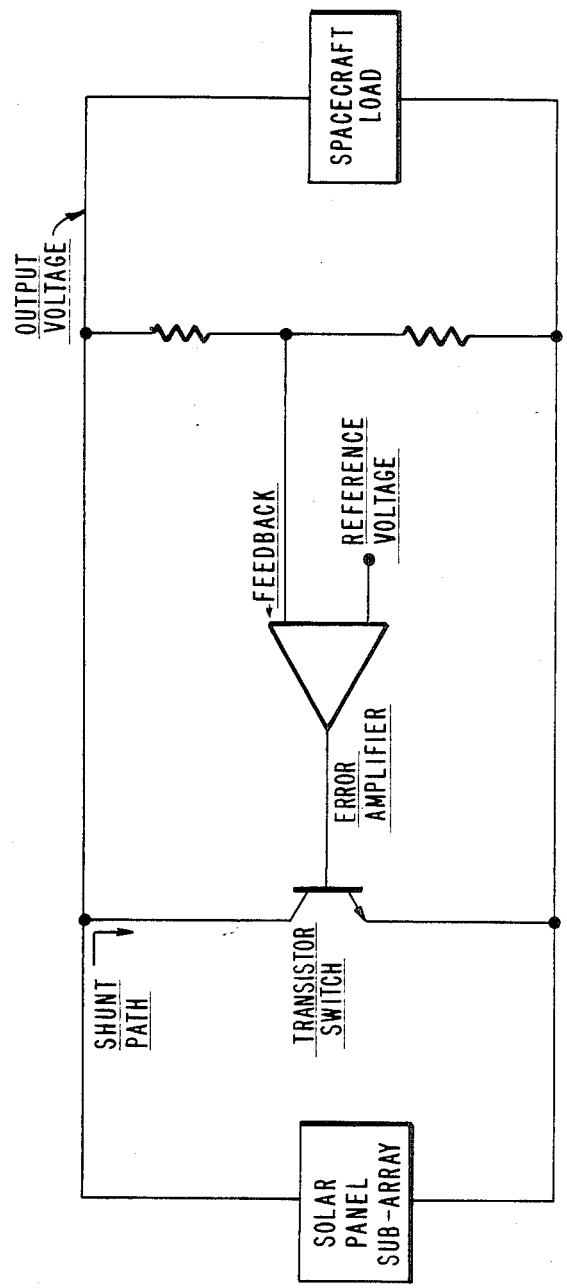
FIGS. 4 through 9 are schematic diagrams. More specifically.
Figure 5:
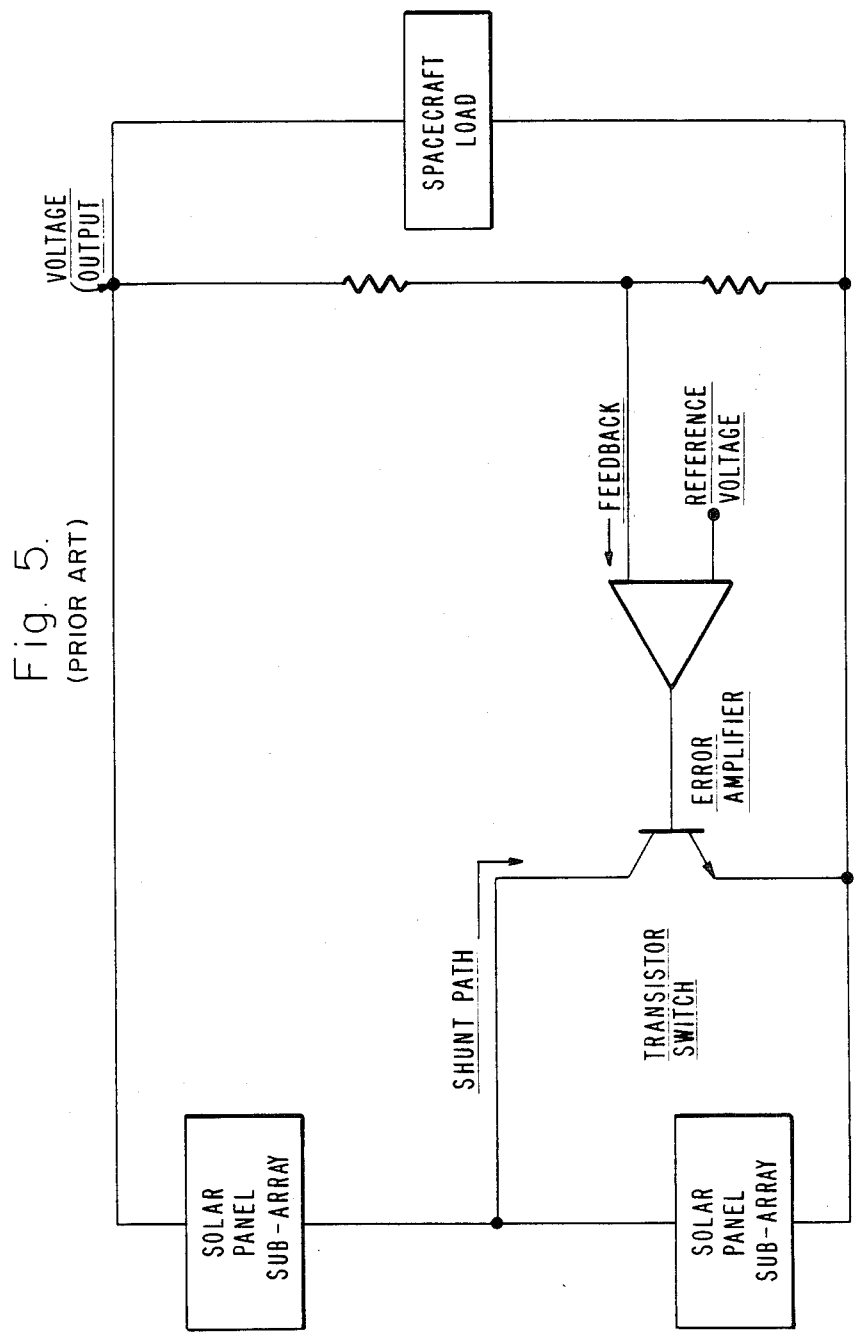

FIG. 1 and FIGS. 6 through 9 represent the voltages-ensing terminals as receiving the entire load voltage. As will be apparent to an electronics technician, the voltage-sensing terminals may instead be connected to receive a calibrated fraction of the load voltage—as in the prior art illustrations of shunt-limiter circuits in FIGS. 4 and 5. Other ways of deriving a signal representative of the voltage at the load (such as, for example, monitoring an intermediate voltage test point within the load itself), may be substituted within the scope of our claims.

Another fundamental alternative within the scope of our appended claims is to use some measure of the load current rather than the load voltage as a feedback signal. In this regard, the illustration in FIG. 1 and in FIGS. 6 through 9 of "voltage-sensing terminals" connected at 31', 131', 231', 331' and 431' may be understood to equivalently represent suitable connections for monitoring current in the load.

Our invention is not limited to use with solar panels, but rather may be applicable to any electrical power source whose voltage-current characteristic is sufficiently similar to that of the solar panels. In particular, our invention will probably be electrically compatible with an alternative source that has a first operating region of relatively constant current and variable voltage, and a second operating region of relatively constant voltage and variable current. These regions, however, need not be as sharply well defined as those of solar panels. The current-voltage characteristic of a radioisotope thermoelectric generator, for example, would probably work with our invention.

It should be noticed that no polarities appear in the drawings; thus, the illustrated geometries may be inverted so that the part of the solar-panel array operated as a current source, and which feeds the regulator, is at the top of the drawing instead of the bottom—while the part of the array operated as a voltage source is at the bottom. Other variants may also be introduced within the scope of the appended claims.

Now to complete the disclosure of our invention at a level sufficient to fully enable practice of our invention by one skilled in the art, we will present some specifics of the components used in the regulator circuits.

Figure 6:
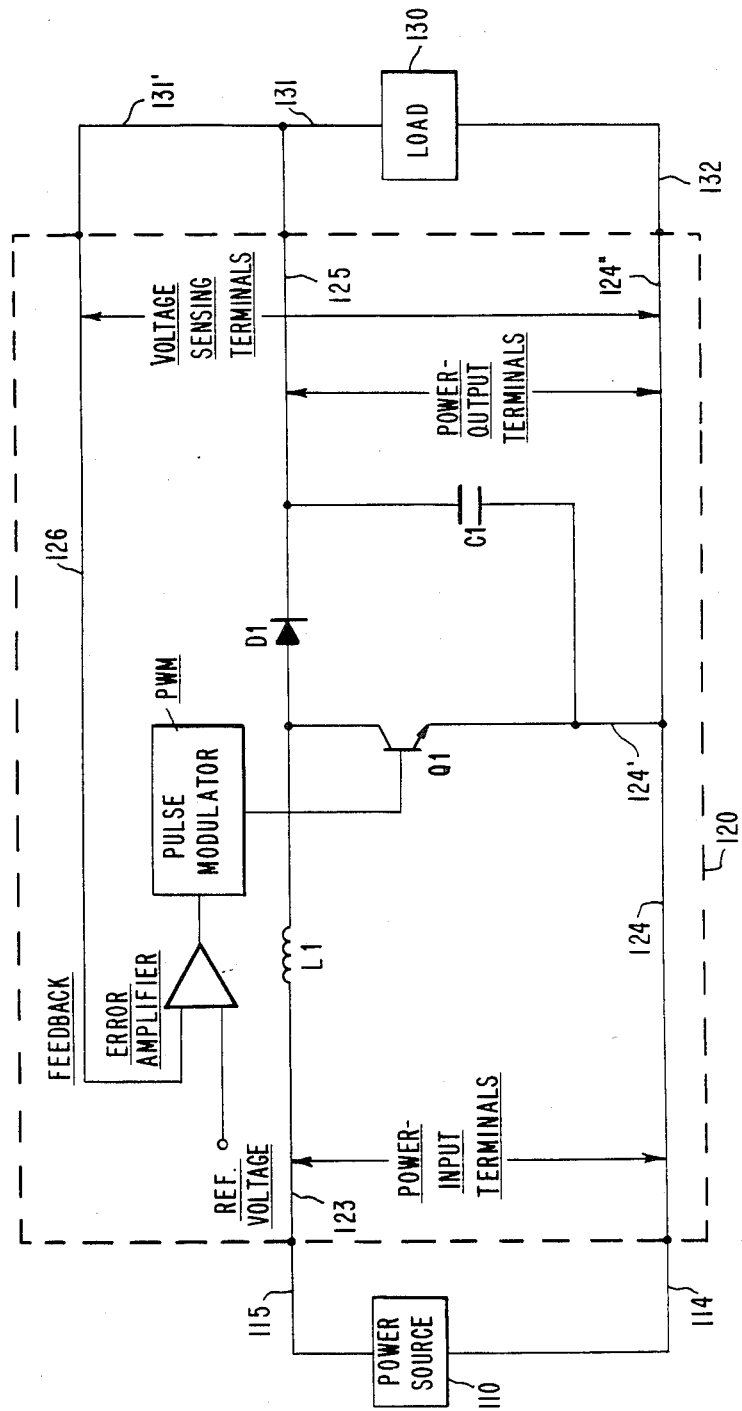
Figure 7:
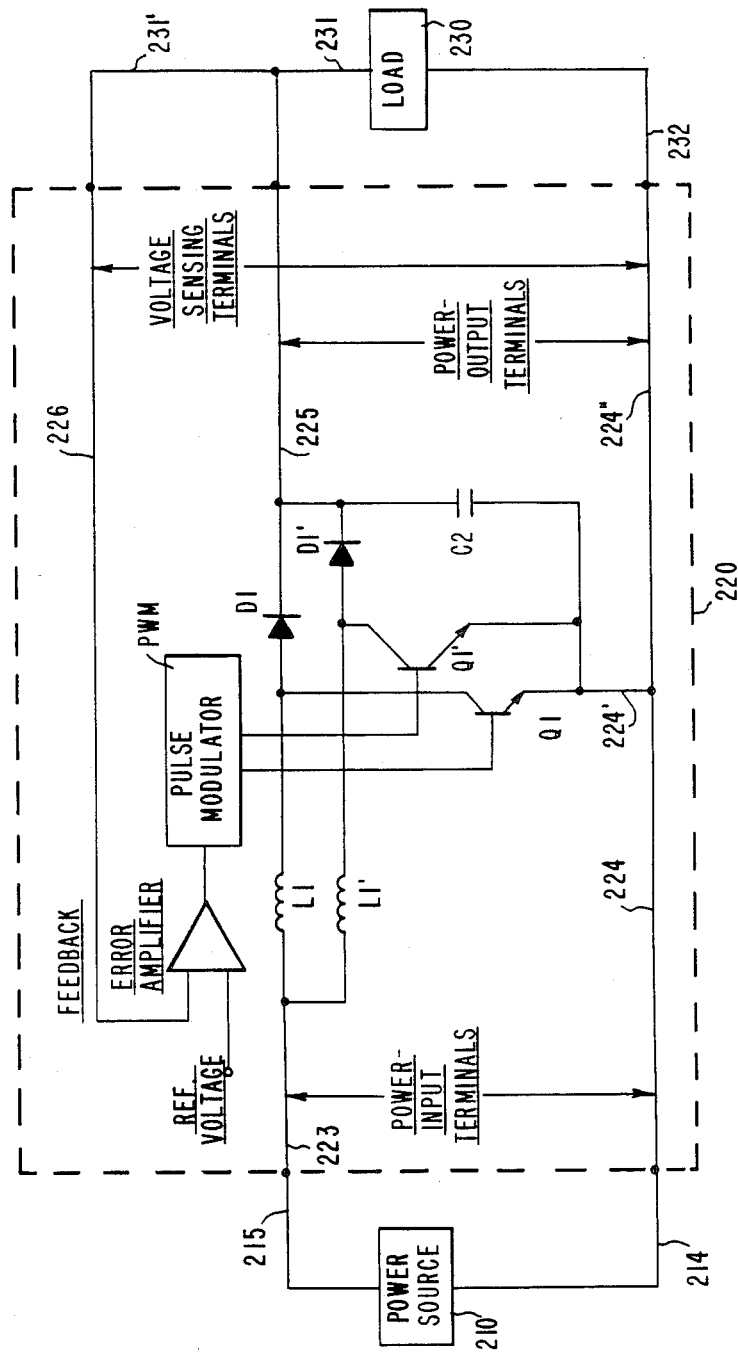
Figure 8:
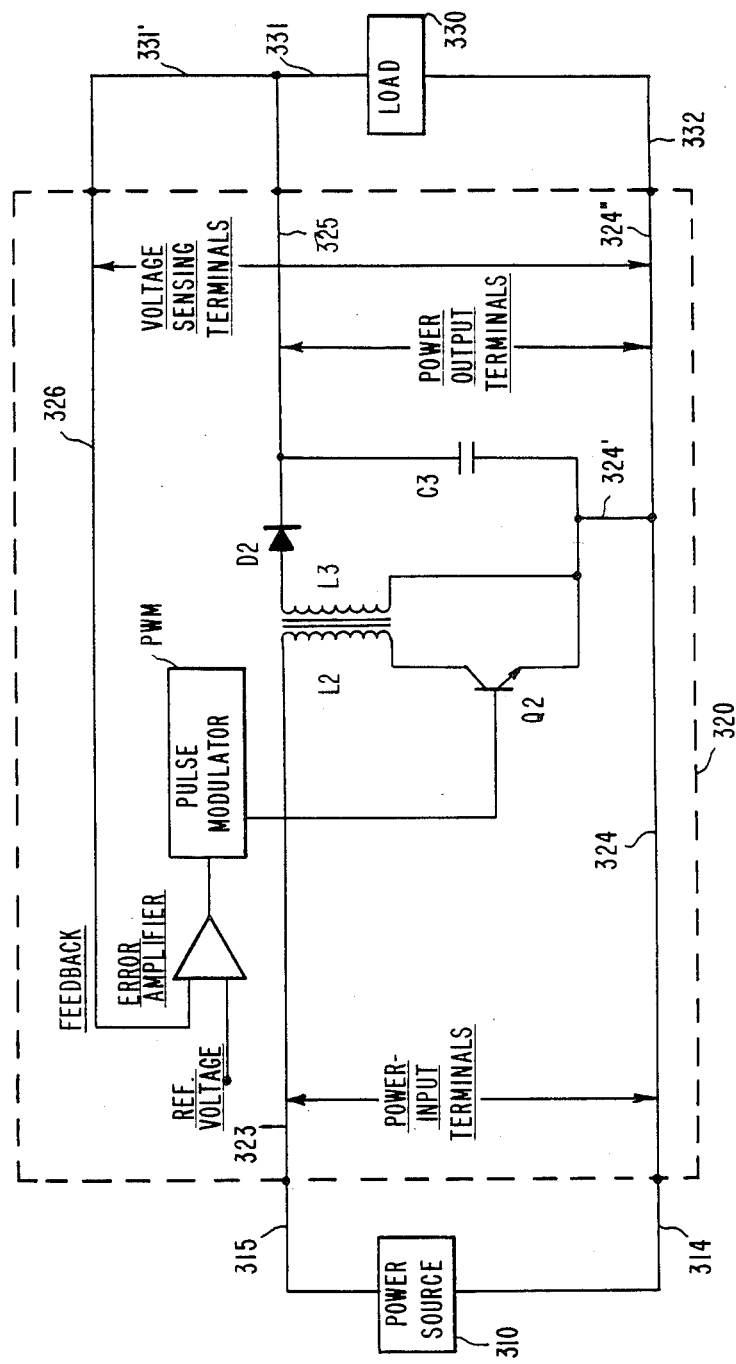
Figure 9:
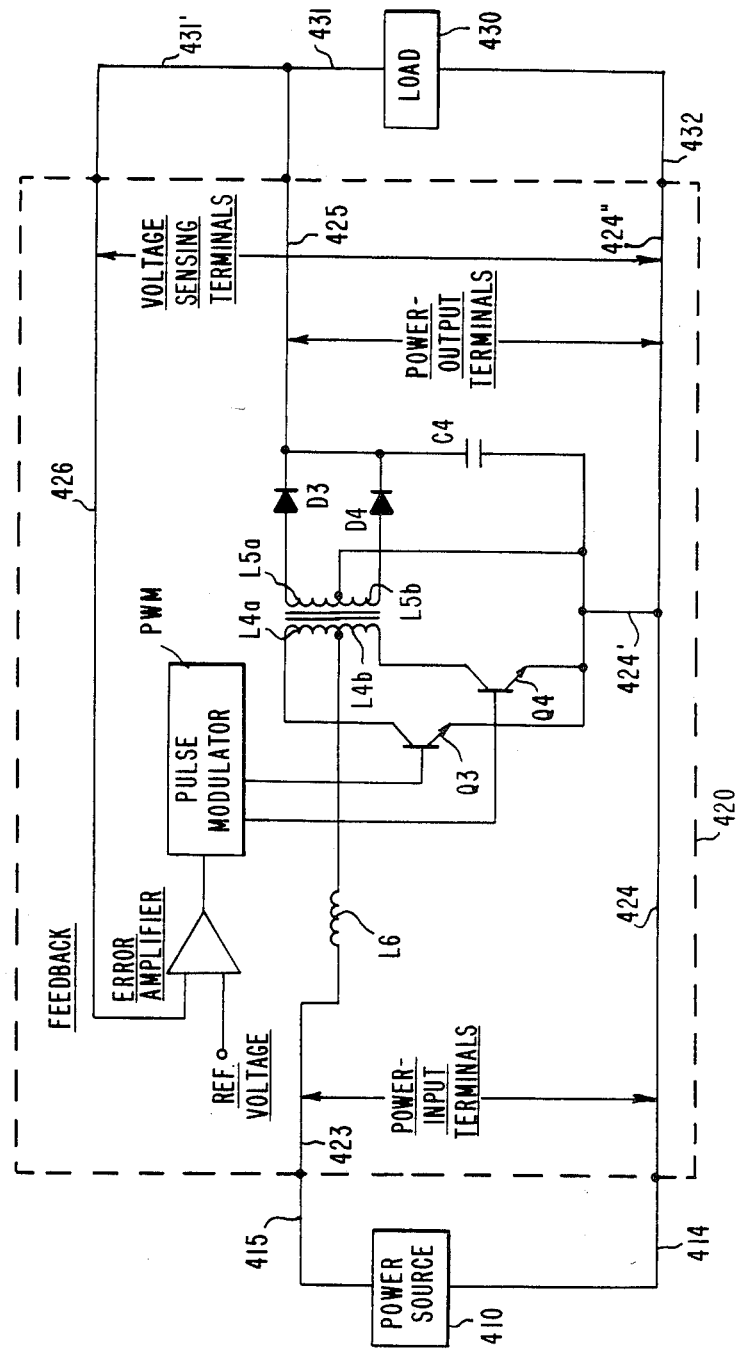

The simple boost-regulator circuit of FIG. 6 is sufficient for purposes of our invention. The other circuits shown in FIGS. 7 through 9 have some minor advantages, but they are illustrated only to show that the FIG. 6 circuit is not the only kind of boost regulator usable to implement our invention; rather, a great number of kinds can be used within the scope of our invention.

The FIG. 6 circuit may be effectively implemented for each of two power buses on a relatively small satellite by using a one hundred microhenry inductor L1 and a two thousand microfarad capacitor C1, and by using multiple transistor switches and multiple diodes available commercially under the respective component designators 2N6215 and STFF15. Each bus on the satellite mentioned carries nominally 11.3 amperes at 29.1 volts, for a total power of roughly three hundred watts per bus. As will be apparent to skilled artisans in the field of spacecraft power electronics, this description is slightly idealized or simplified, in that an actual spacecraft power regulator typically would be designed to optimize the overall spacecraft electronics system by using separate regulators for, e.g., different portions of the load—to spread the heat dissipation, reduce capacitance, and provide some redundancy. The error amplifier and pulse modulator may be entirely conventional subunits.

We present FIG. 10 as a schematic of a simple circuit which has been built as a prototype breadboard and successfully tested. This circuit is electrically a scale model, operating at approximately 300 milliamperes. This schematic can easily be "scaled up" to handle the large currents which would normally be associated with spacecraft operation. Component values and designators are shown directly on the drawing.

It is to be understood that all of the foregoing detailed descriptions are by way of example only and not to be taken as limiting the scope of our invention—which is expressed only in the appended claims.

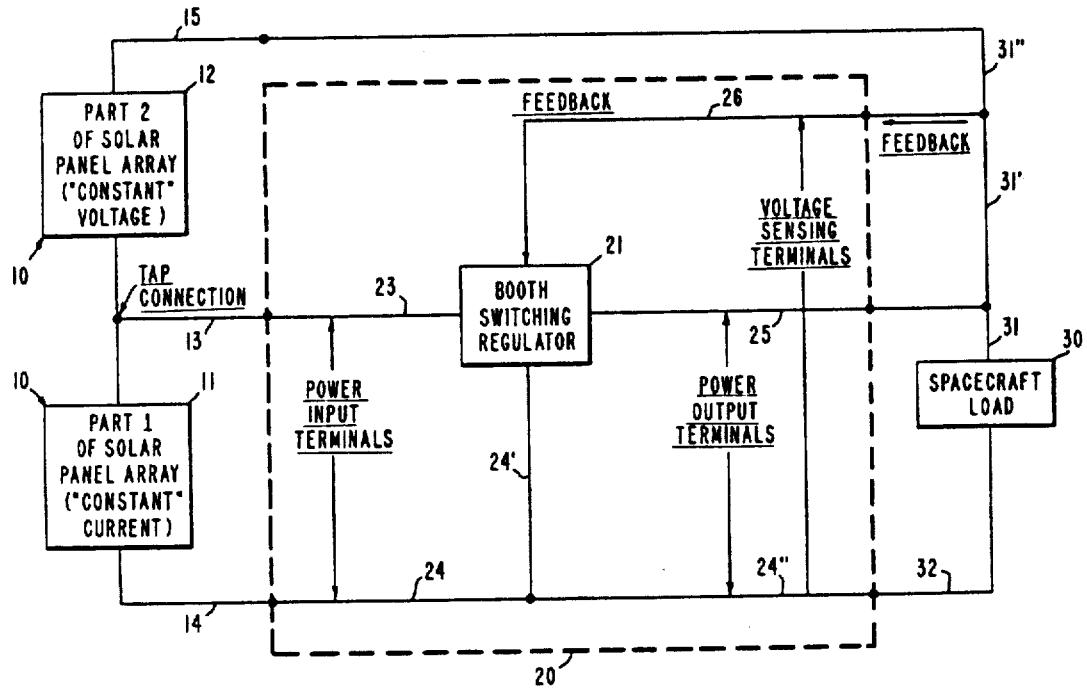

What is claimed is:

1. A regulating system for electric power sources adaptable for use with an array of solar panels, each solar panel having a generally constant current, variable voltage operating region, each solar panel also having a generally constant voltage, variable current operating region whose output is applied to a load; said system comprising:
   a tap connection to such array, dividing such array into first and second portions in series;
   said first portion of such solar-panel array operates with all of its solar panels substantially in their generally constant-current operating region; and
   said second portion operates with at least some of its solar panels substantially in their generally constant-voltage operating region;
   a boost switching regulator having power-input, power-output, and sensing terminals connected so that:
   the power-input terminals are across only the first portion of such array, to receive power from only said first portion,
   the power-output terminals are across such load, and
   the sensing terminals receive a signal which is a measure of the voltage across or current into such load.

2. The regulating system of claim 1 wherein:
   the boost switching regulator further comprises a reference source for comparison with said measure of the voltage across such load.

3. The regulating system of claim 1, wherein, in use:
   the boost switching regulator controls the voltage across all of such array to approximate a desired fixed value by drawing only enough power from said first portion to cause the voltage across said first portion to approximately equal the difference between a desired fixed value, and the generally constant voltage from said second portion.

4. The regulating system of claim 3, wherein, in use:
   the boost switching regulator controls the voltage across all of such array by forcing into such load an amount of current just required to produce across such load an approximation of a desired fixed voltage value.

5. The regulating system of claim 4, wherein:
   the boost switching regulator further comprises a reference voltage source for comparison with said measure of the voltage across such load.

6. The regulating system of claim 5, wherein, in use:
   the boost switching regulator controls the amount of current forced into such load by modulating the width of current pulses entering such load to cause said measure of voltage across such load to substantially equal said reference voltage.

7. The regulating system of claim 6, wherein: the boost switching regulator is a flyback regulator.

8. The regulating system of claim 3 for use with such solar panels that have a limited useful life, at the beginning of which life they produce relatively high current and at the end of which life they produce relatively low current; and wherein:
   the number of solar panels in such array, and the position of the tap connection along such array, are selected so that when such solar panels are generally at the beginning of their useful life, the voltage produced by the second portion of such array alone does not exceed values that can be accommodated by such load.

9. The regulating system of claim 8, wherein, when such solar panels are generally at the end of their useful life:
   both portions of such array operate in their generally maximum-power operating region;
   the voltage produced by both portions in series is just sufficient to provide nominal minimum operating voltage and current to such load; and
   generally negligible power flows through the boost switching regulator.

10. The regulating system of claim 9, wherein: the boost switching regulator is a current-fed inverter.

11. The regulating system of claim 1, wherein: the boost switching regulator is a flyback regulator.

12. The regulating system of claim 1, wherein: the boost switching regulator is a current-fed inverter.

* * * * *

UNITED STATES PATENT AND TRADEMARK OFFICE
CERTIFICATE OF CORRECTION

PATENT NO. : 4,691,159

DATED : September 1, 1987

INVENTOR(S) : Allan F. Ahrens, et al

It is certified that error appears in the above-identified patent and that said Letters Patent is hereby corrected as shown below:

The title page should be deleted to appear as per attached title page.

Signed and Sealed this

Twenty-sixth Day of December, 1989

Attest:

JEFFREY M. SAMUELS

*Attesting Officer*     Acting Commissioner of Patents and Trademarks

United States Patent
Ahrens et al.

[11] Patent Number: 4,691,159
[45] Date of Patent: Sep. 1, 1987

[54] PARTIAL SHUNT SWITCHING LIMITER FOR A SPACECRAFT SOLAR-PANEL OR LIKE POWER-SOURCE ARRAY

[75] Inventors: Allan F. Ahrens, Acton; Robert M. Martinelli, Torrance, both of Calif.

[73] Assignee: Hughes Aircraft Company, Los Angeles, Calif.

[21] Appl. No.: 771,396

[22] Filed: Aug. 30, 1985

[51] Int. Cl.⁴ .............................................. G05F 5/00
[52] U.S. Cl. .................................. 323/222; 323/906; 363/21; 363/26; 307/72
[58] Field of Search ............................ 323/222, 906; 363/19–21, 24–26; 307/48–50, 72, 77

[56] References Cited

U.S. PATENT DOCUMENTS 4,375,662  3/1983  Baker ............................ 323/906 X Primary Examiner—Peter S. Wong
Attorney, Agent, or Firm—Joseph A. Sawyer, Jr.; Mark J. Meltzer; A. W. Karambelas

[57] ABSTRACT

This regulating system for an array of solar panels or the like consists of a tap connection into the array, and a boost switching regulator connected to the tapped array. The tap connection divides the array into first and second portions, and the switching regulator is connected so that its power-input terminals are across only one of the two portions of the array. The power-output terminals of the switching regulator are connected across the load (i.e., across the entire array), and the sensing or feedback terminals of the regulator receive a signal which acts as a measure of voltage or current at the load.

Boost regulators do not dump overvoltage into a dissipative load; hence the invention prevents local heat generation and resulting spacecraft heat-balance problems of conventional dissipative regulators. Furthermore, in the circuit of the present invention, negligible power flows through the regulator at the end of the solar-panel useful life; hence efficiency losses in the boost regulator itself are avoided when power is at its greatest premium.

12 Claims, 10 Drawing Figures